United States Patent
Shimoi et al.

(10) Patent No.: US 10,720,651 B2
(45) Date of Patent: Jul. 21, 2020

(54) CATHODE ELECTRODE FOR FUEL CELL

(71) Applicant: NISSAN MOTOR CO., LTD., Yokohama-shi, Kanagawa (JP)

(72) Inventors: Ryoichi Shimoi, Yokohama (JP); Satoshi Takaichi, Yokohama (JP); Shinichi Miyazaki, Yokohama (JP); Takehiko Okui, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 68 days.

(21) Appl. No.: 14/380,775

(22) PCT Filed: Feb. 26, 2013

(86) PCT No.: PCT/JP2013/054998
§ 371 (c)(1),
(2) Date: Aug. 25, 2014

(87) PCT Pub. No.: WO2013/129417
PCT Pub. Date: Sep. 6, 2013

(65) Prior Publication Data
US 2015/0030966 A1  Jan. 29, 2015

(30) Foreign Application Priority Data
Feb. 28, 2012  (JP) .................. 2012-041754

(51) Int. Cl.
*H01M 4/92* (2006.01)
*H01M 4/86* (2006.01)
(Continued)

(52) U.S. Cl.
CPC ......... *H01M 4/921* (2013.01); *H01M 4/8605* (2013.01); *H01M 4/926* (2013.01);
(Continued)

(58) Field of Classification Search
None
See application file for complete search history.

(56) References Cited

U.S. PATENT DOCUMENTS

2009/0233135 A1*  9/2009  Horiuchi .................. H01M 4/90
429/425
2010/0159305 A1*  6/2010  Yan ...................... H01M 4/8605
429/523
(Continued)

FOREIGN PATENT DOCUMENTS

| CN | 101310403 A | 11/2008 |
| CN | 101773855 A | 7/2010 |

(Continued)

OTHER PUBLICATIONS

Ohma et al., Analysis of proton exchange membrane fuel cell catalyst layers for reduction of platinum loading at Nissan, 2011, Electrochimica Acta, 56, 10832-10841. (Year: 2011).*

*Primary Examiner* — Haixia Zhang
(74) *Attorney, Agent, or Firm* — Foley & Lardner LLP (57) ABSTRACT

A cathode electrode for a fuel cell, includes a conductive carrier having pores and a catalyst having a platinum alloy supported in the pores of the conductive carrier, wherein the catalyst has in a pore diameter range of 2 to 6 nm when diameters of the pores is plotted in relation with volumes of the pores a peak value of more than 1 $cm^3/g$ and also a BET specific surface area of 1300 $m^2/g$.

13 Claims, 7 Drawing Sheets

(51) Int. Cl.
  *H01M 8/10*  (2016.01)
  *H01M 8/1018*  (2016.01)
(52) U.S. Cl.
  CPC ............... *H01M 8/10* (2013.01); *H01M 4/86* (2013.01); *H01M 4/92* (2013.01); *H01M 2004/8689* (2013.01); *H01M 2008/1095* (2013.01)

(56) References Cited

U.S. PATENT DOCUMENTS

2010/0216057 A1* 8/2010 Ota .................. B01J 21/185
                                                    429/532
2011/0058308 A1   3/2011 Nishi et al.

FOREIGN PATENT DOCUMENTS

| CN | 102760889 A | 10/2012 |
| JP | 2008-041253 A | 2/2008 |
| JP | 2008-041498 A | 2/2008 |
| WO | WO 2009/075264 A1 | 6/2009 |

* cited by examiner

CATHODE ELECTRODE FOR FUEL CELL

TECHNICAL FIELD

The present invention relates to a cathode electrode for a fuel cell.

BACKGROUND ART

There is a prior art reference, WO 2009/075264, relating to the present invention.

SUMMARY OF INVENTION

In a catalyst carrier (carbon) that have been used from past in a fuel cell, catalyst particles are covered with an ionomer in order to secure transportability of a proton ($H^+$). However, if platinum particles are covered with an ionomer, the ORR (Oxygen Reduction Reaction) activity which is inherently possessed by the catalyst particles is not fully expressed, so that performance of the fuel cell has been limited. On the other hand, in order that the catalyst particles might express their inherently possessing performance, when a catalyst carrier in which the catalyst particles were difficult to be covered by the ionomer was used (such as for example, Ketjen black), flooding tended to occur readily especially in high current density in which large amount of water is generated, even though the ORR activity could be slightly enhanced.

Therefore, if a platinum alloy such as PtCo, which has high ORR activity, is used in a cathode electrode catalyst layer in order to enhance the ORR activity, flooding tends to occur more readily in high current density as compared with a usual platinum catalyst because of influence of a surface functional group attached thereto during the catalyst manufacturing process. Accordingly, this cannot be used in a fuel cell stack especially for the type of high current density.

The present invention was made in view of the existing problems as mentioned above. Therefore, an object of the present invention is to provide a cathode electrode for a fuel cell satisfying both enhancements of the ORR activity and of the flooding resistance.

An embodiment of the cathode electrode for a fuel cell of the present invention includes a conductive carrier having pores and a catalyst having a platinum alloy supported in the pores of the conductive carrier. And, here, the conductive carrier has in a pore diameter range of 2 to 6 nm when diameters of the pores are plotted in relation with volumes of pores a peak value of more than 1 $cm^3/g$ and also a BET specific surface area of 1300 $m^2/g$.

Embodiments of the present invention and advantages of the present invention will be explained hereunder with referring to the drawings attached hereto.

DESCRIPTION OF EMBODIMENTS

Figure 1A:
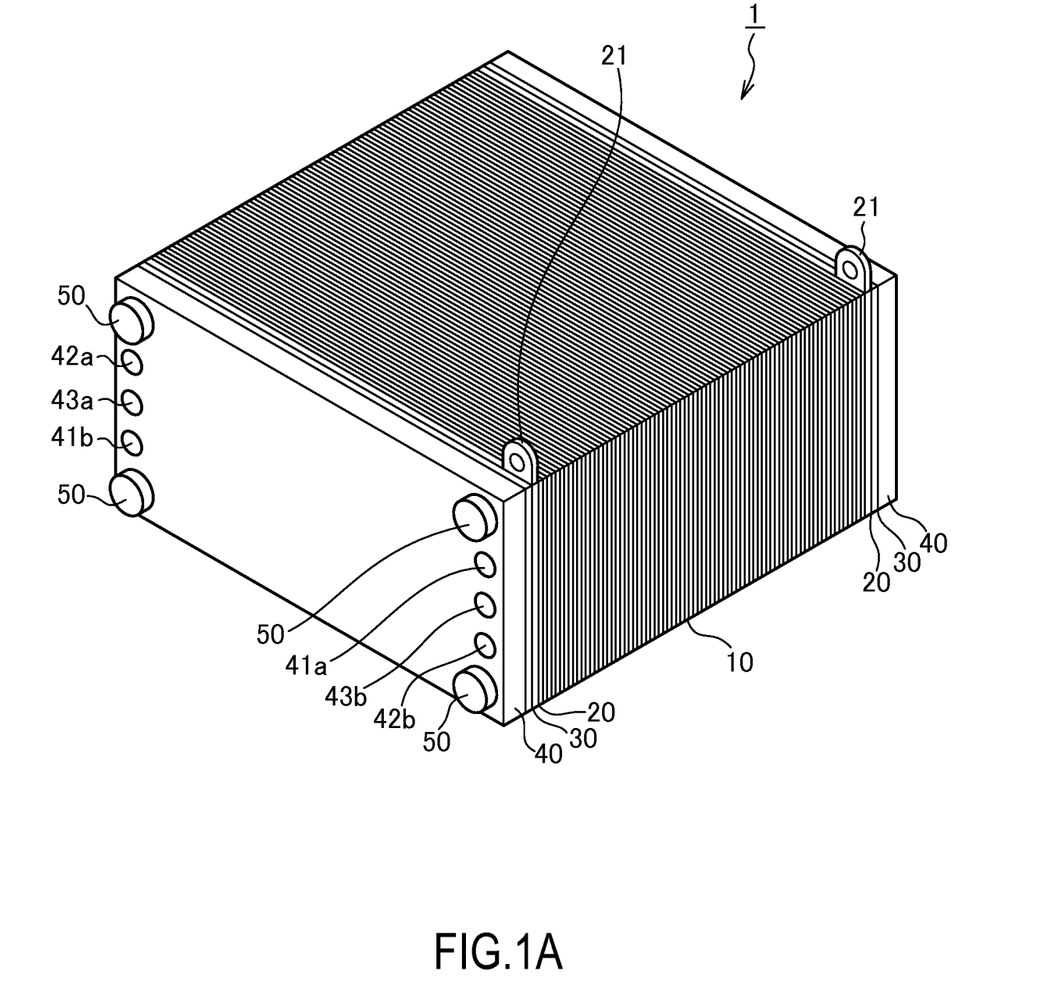
FIG. 1A shows an outer perspective view to explain the fuel cell to which the cathode electrode for a fuel cell according to the present invention is applied.
Figure 1B:
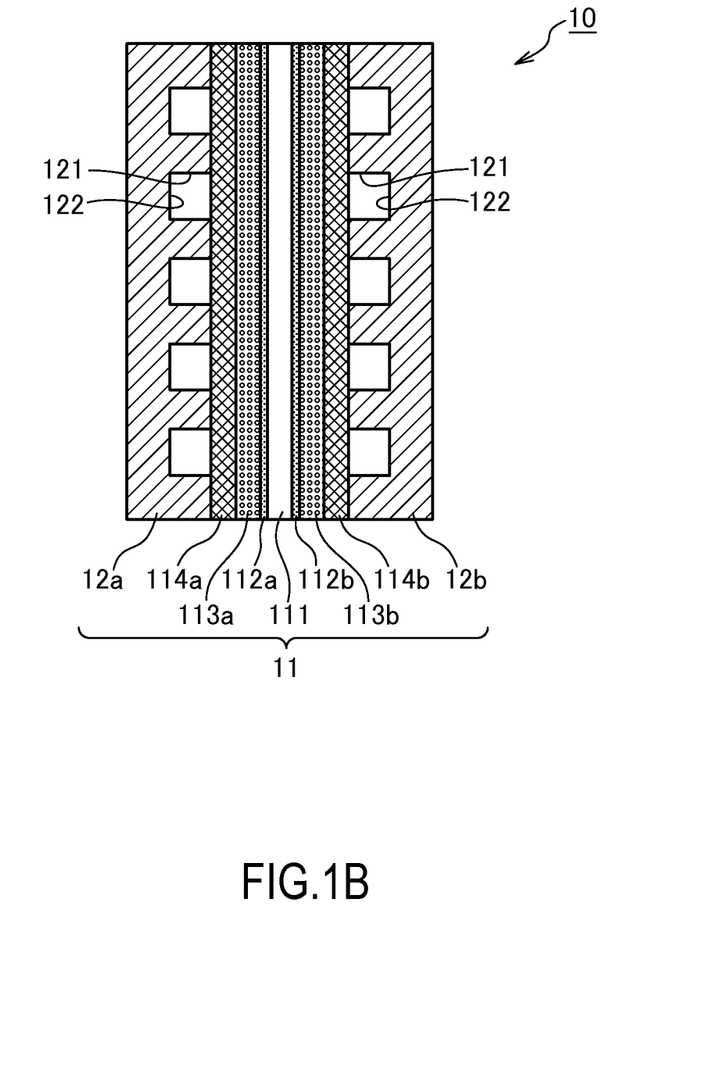
FIG. 1B shows an enlarged view of a power generating cell of the fuel cell to which the cathode electrode for a fuel cell according to the present invention is applied.

FIG. 1A and FIG. 1B are drawings to explain the fuel cell to which the cathode electrode for the fuel cell according to the present invention is applied, wherein showing the outer perspective view thereof in FIG. 1A and the enlarged view of the power generating cell thereof in FIG. 1B.

At first, the basic configuration of the fuel cell is explained by referring to FIG. 1. The fuel cell stack 1 has the stack of a plurality of the power generating cell 10, the current collecting plates 20, the insulating plates 30, the end plates 40, and four tension rods 50.

The power generating cell 10 is the unit cell of the fuel cell. Each of the power generating cells 10 generates about one volt (V) of the electromotive voltage. Configuration details of each of the power generating cells 10 will be explained later.

Each of the current collecting plates 20 is placed outside the stack of a plurality of the power generating cells 10, and the current collecting plates 20 are formed of a gas-impermeable conductive member such as, for example, a metal and a fine carbon. Each of the current collecting plates 20 is provided with the output terminal 21 on part of the upper hem. The fuel cell stack 1 receives from the respective output terminals 21 an electron $e^-$ generated in each of the power generating cells 10 and then outputs the electricity.

Each of the insulating plates 30 is placed outside the respective current collecting plates 20. The insulating plates 30 are made of an insulating material such as, for example, a resin and a rubber.

Each of the end plates 40 is placed outside the respective insulating plates 30. The end plates 40 are made of a rigid metal material such as, for example, a steel.

Arranged in one of the end plates 40 (in FIG. 1A, the end plate 40 in the left front side) are the anode supply port 41a, the anode discharge port 41b, the cathode supply port 42a, the cathode discharge port 42b, the cooling water supply port 43a, and the cooling water discharge port 43b. In this embodiment, the anode supply port 41a, the cooling water discharge port 43b, and the cathode discharge port 42b are placed in the right side of the drawing, while the cathode supply port 42a, the cooling water supply port 43a, and the anode discharge port 41b are placed in the left side of the drawing. In this drawing, the supply ports and the discharge ports are arranged in the way as mentioned above, however, they may be arranged in the reverse way as well.

Each of the tension rods 50 are placed near four corners of the respective end plates 40. The fuel cell stack 1 has holes that are penetrating into it. The tension rods 50 are inserted into these penetrating holes. The tension rods 50 are made of a rigid metal material such as, for example, a steel. The tension rods 50 are treated for insulation on the surfaces thereof in order to prevent an electrical short circuit among the power generating cells 10 from occurring. These tension rods 50 and the nuts 51 are screwed together. The fuel cell stack 1 is screwed up into the stack direction by the tension rods 50 and the nuts 51 to generate the stacking pressure. In this drawing, clenching of the fuel cell stack 1 is done by the tension rods, however, other clenching methods may be used as well.

As to the method to supply hydrogen gas as the anode gas into the anode supply port 41a, there may be mentioned, for example, a method in which hydrogen gas is supplied directly thereto from a hydrogen storage equipment, a method in which a hydrogen-containing gas obtained by reforming a fuel which contains hydrogen is supplied thereto, and the like. Meanwhile, illustrative example of the hydrogen storage equipment includes a high pressure gas tank, a liquefied hydrogen tank, and a hydrogen storing alloy tank. Illustrative example of the fuel which contains hydrogen gas includes natural gas, methanol, and gasoline. As to the cathode gas to be supplied to the cathode supply port 42a, an air is generally used.

Arranged to the fuel cell stack 1 are, on both sides of the stacked plural power generating cells 10, the current collecting plates 20, the insulating plates 30, and the end plates 40.

Arranged outside the insulating plate 30 on one side of the fuel cell stack is a sub-end plate, arranged outside the sub-end plate is a displacement-absorbing member such as, for example, a plate spring, and arranged further outside thereof is the end plate 40. The fuel cell stack with this stack structure is screwed up into the stack direction by four tension rods 50. Because the displacement absorbing member is arranged in the way as mentioned above, the change in plane pressure acting to the fuel cell stack can be absorbed.

As shown in FIG. 1B, the power generating cell 10 has the structure that the anode separator 12a and the cathode separator 12b are arranged on both surfaces of the membrane electrode assembly (MEA) 11. In MEA 11, the electrode catalyst layers 112 (the anode electrode catalyst layer 112a and the cathode electrode catalyst layer 112b) are formed on both surfaces of the electrolyte membrane 111 formed of an ion-exchange membrane. Arranged on these electrode catalyst layers 112 (the anode electrode catalyst layer 112a and the cathode electrode catalyst layer 112b) are the micro porous layers (MPL) 113 (113a and 113b). Formed on the MPL 113 (113a and 113b) are the gas diffusion layers (GDL) 114 (114a and 114b).

The electrode catalyst layers 112 (the anode electrode catalyst layer 112a and the cathode electrode catalyst layer 112b) are formed, for example, on the electrolyte membrane by hot-pressing or direct spraying of a mixture comprising an electrolyte (ionomer), a water-repellent material, and a carbon carrier which supports catalyst particles (for example platinum particles). Meanwhile, in this embodiment, a platinum alloy is used as the catalyst. Specific example of the platinum alloy includes PtCo, PtNi, PtFe, and PtCu.

MPL 113 is the layer of a mixture mainly comprising a powdered conductive carbon such as carbon black and a substance acting as a binder as well as a water-repellent material including polytetrafluoroethylene (PTFE) resin. MPL 113 prevents the electric short circuit caused by penetration of a fiber of GDL 114 through the electrolyte membrane 111 from occurring. In addition, MPL 113 enlarges the contact area between the electrode catalyst layer 112 and GDL 114. Moreover, MPL 113 prevents flooding and drying out from occurring by controlling water drainage of the electrode catalyst layers 112 thereby optimizing the wet condition of the electrode catalyst layers 112 during power generation. Furthermore, MPL 113 facilitates distribution of the reacting gases whereby enhancing the power generation performance of the fuel cell.

GDL 114 is formed of a member having sufficient gas diffusion and conductivity, such as, for example, a carbon fiber.

The anode separator 12a is stacked on one surface (left surface in FIG. 1B) of MEA 11 via GDL 114a and MPL 113a. The cathode separator 12b is stacked on one surface (right surface in FIG. 1B) of MEA 11 via GDL 114b and MPL 113b. The anode separator 12a and the cathode separator 12b are formed of a separator substrate made of a metal such as, for example, titanium, stainless steel, and aluminum. The anode separator 12a and the cathode separator 12b are formed by treating the foregoing separator substrate by cold pressing, chemical etching, sand blasting, and so forth. The anode separator 12a and the cathode separator 12b are covered on their surfaces by a precious metal including gold, or by a conductive carbon material, and thus, they are conductive. As another embodiment, the anode separator 12a and the cathode separator 12b may be formed by a resin molding method by using a powdered conductive carbon such as carbon black.

In the fuel cell stack having the configuration as mentioned above, the anode gas $H_2$ supplied from the anode supply port 41a runs though GDL 114a, and then reaches the anode electrode catalyst layer 112a. The cathode gas $O_2$ supplied from the cathode supply port 42a runs though GDL 114b, and then reaches the cathode electrode catalyst layer 112b. Then, the reaction shown below takes place in the anode electrode catalyst layer 112a and the cathode electrode catalyst layer 112b, whereby generating an electric power.

Anode electrode catalyst layer: $2H_2 \rightarrow 4H^+ + 4e^-$

Cathode electrode catalyst layer: $4H^+ + 4e^- + O_2 \rightarrow 2H_2O$ [Chem. 1]

Figure 2A:
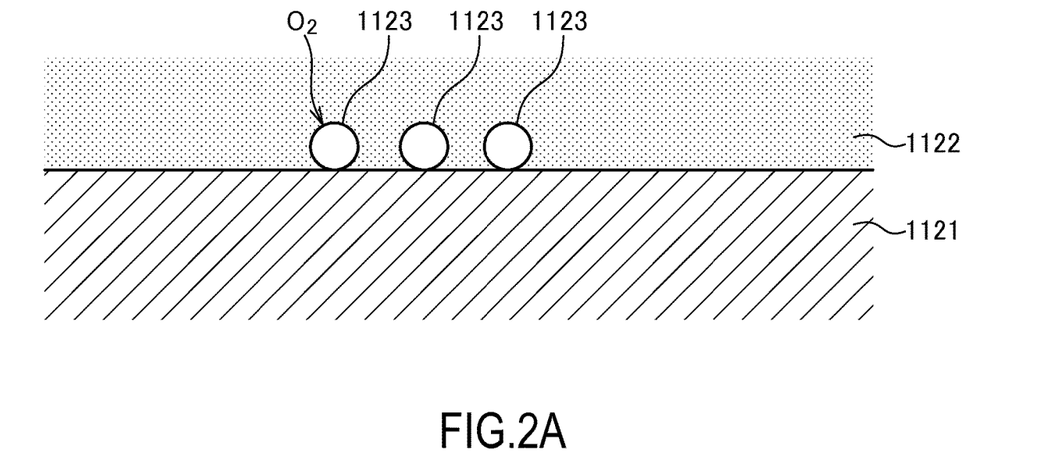
FIG. 2A shows the drawing by which the problems to be solved by the embodiment are explained.
Figure 2B:
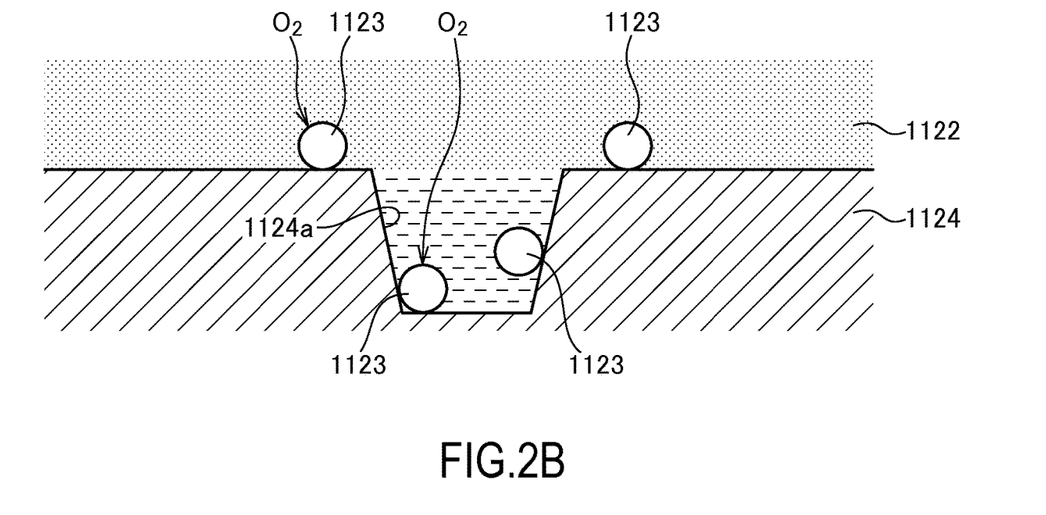
FIG. 2B shows the drawing by which the problems to be solved by the embodiment are explained.

Next, the problems to be solved by this embodiment will be explained by referring to FIG. 2A and FIG. 2B.

As discussed above, in the cathode electrode catalyst layer 112b the cathode gas $O_2$ is consumed during the power generation reaction. However, it became apparent from the study of inventors of the present invention that platinum particles used in the conventional electrode catalyst layer could not express fully the performance (ORR activity) which is inherently possessed by the platinum particles. It was then found that, in order to compensate the performance decrease, much larger amount of platinum was necessary. Because platinum is expensive, it is preferable to reduce the use amount thereof. Inventors of the present invention carried out an extensive investigation on the reaction taking place in the electrode catalyst layer. As shown in FIG. 2A, in the state in which the platinum particles 1123 are present on surface of the carbon carrier 1121, surfaces of the platinum particles 1123 are covered with the ionomer 1122. It was found by inventors of the present invention that, in the state like this, because the ionomer 1122 covered the platinum particles 1123, the platinum particles 1123 could not express the performance (ORR (oxygen reduction reaction) activity) which was inherently possessed by the platinum particles.

To overcome this problem, as the carrier to support the platinum particles, for example, use of the Ketjen black may be considered. As shown in FIG. 2B, in the Ketjen black 1124, there exists the space 1124a into which the ionomer 1122 cannot enter. The platinum particles 1123 are supported also in this space 1124a. This space is vacant during the dry state, while this is filled with water during the wet state. Because the ionomer 1122 does not enter into the space, the platinum particles 1123 are not covered with the ionomer, and as a result of it, the ORR activity of the platinum particles 1123 is not hampered.

However, in the case of using the Ketjen black, especially in the high current density in which large amount of water is generated, it was found by inventors of the present invention that flooding tended to occur readily, and also that the oxygen transporting capacity was deteriorated. Inventors of the present invention further carried out an extensive investigation on this aspect and found that this was caused because too much platinum particles were present in the space of the Ketjen black. In other words, plural platinum particles are present in the same space of the Ketjen black. It is the inventors' opinion that because of this, these platinum particles compete for oxygen thereby deteriorating the oxygen transportation capacity thereof.

Therefore, the inventors came to the idea of using a meso porous carbon as the carrier to support the catalyst.

Now, explanation will be made as to the meso porous carbon. One of the morphologies of the meso porous carbon is a tree-like carbon nanostructure in which the carbon-containing body in the rod-like or the ring-like form is branched. The meso porous carbon is produced, for example, by the method shown below.

That is, an acetylene gas is blown into an aqueous ammonia solution of silver nitrate with irradiating an ultrasonic wave. During this operation, it is preferable to stir the solution simultaneously with the irradiation of the ultrasonic wave. By so doing, deposition of silver acetylide takes place in the solution.

Next, this deposited substance in the state of containing the solvent was subdivided into test tubes, and then these are heated in a vacuum electric furnace or in a vacuum high temperature tank at the temperature of 60 to 80° C. and for the period of, for example, 12 hours or longer. Then, silver acetylide is separated segregatively, thereby giving a metal-incorporated tree-like nanostructure in which the metal silver particle is included.

Subsequently, the metal-incorporated tree-like nanostructure is heated at the temperature of 160 to 200° C. and for the period of, for example, 10 to 30 minutes. This heat treatment may be executed consecutively after the previous heat treatment. Because the temperature herein is higher than the previous heating temperature (60 to 80° C.), as the temperature raises, the remaining silver acetylide explodes in a nanoscale so that silver included in the metal-incorporated tree-like nanostructure is spilled out explosively, whereby the carbon nanostructure can be obtained.

This carbon nanostructure is washed by dissolution to remove silver remained on surface thereof and other unstable carbon compounds, whereby the stable carbon nanostructure can be obtained. In this case, especially if washing by dissolution is done by using an aqueous nitric acid solution, the remained silver can be reused as silver nitrate, and thus, this is effective.

Thereafter, the carbon nanostructure thus washed by dissolution is placed under vacuum, or in an inert gas atmosphere or an air atmosphere, and then, it is heated, for example, at the temperature of 180 to 200° C. and for the period of 24 to 48 hours.

By so doing, the meso porous carbon can be obtained. Here, the production method of the carbon nanostructure by using silver is explained, but other raw material metals may be used as well.

The meso porous carbon thus obtained has a tree-like structure in which the carbon in the rod-like or the ring-like form is branched. And also, the meso porous carbon is the structure body in which the carbon has a graphene layer formed on the wall of the pores (meso pores). In addition, the meso porous carbon is the structure body wherein a peak value thereof in the pore diameter range of 2 to 6 nm when radii of the pores (vacant holes) are plotted in relation with volumes of the pores is more than 1 $cm^3/g$ and also the BET specific surface area is more than 1300 $m^2/g$. Meanwhile, the relationship between the pore radii and the pore volumes may be analyzed by amount of the adsorbed gas according to the nitrogen adsorption method. The BET specific surface area may be measured by, for example, the method according to JIS Z 8830:2001 (measurement method of the specific surface area of powders (solid) by gas adsorption).

Figure 3:
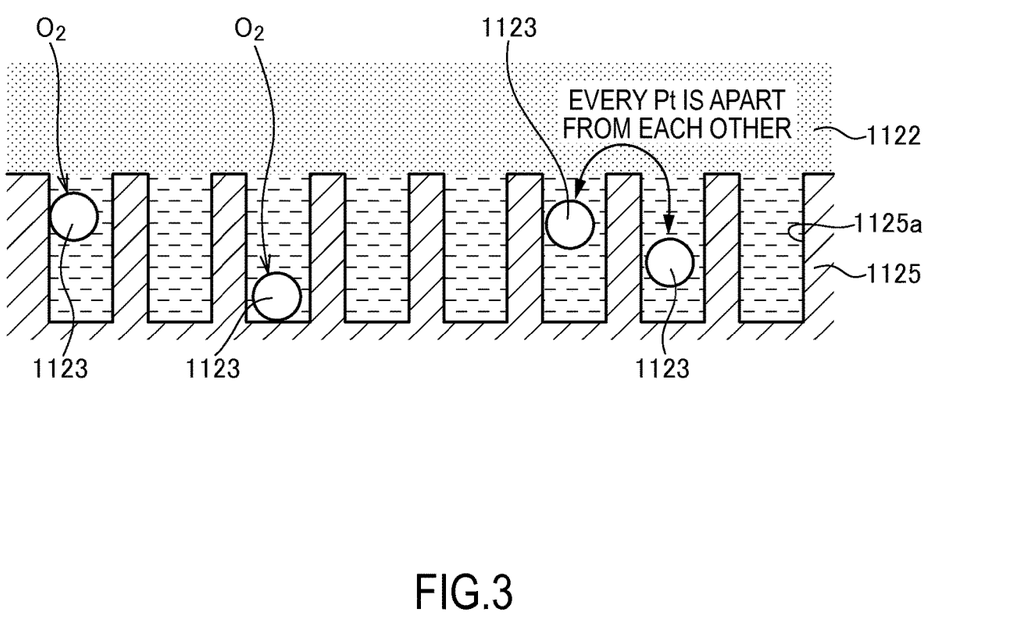
FIG. 3 shows the drawing by which effects of the action of the embodiment are explained.

FIG. 3 shows the drawing by which effects of the action of this embodiment are explained.

In this embodiment, the meso porous carbon is used as the carrier to support the catalyst. And the meso porous carbon supports the catalyst particles (platinum alloy particles).

Diameters of the platinum alloy particles are in the range of about 2 to 6 nm (the value may be larger than this value depending on the production method thereof). On the other hand, there are many pores (small holes) 1125a whose diameter is in the range of about 2 to 6 nm in the meso porous carbon 1125. Because of this, as shown in FIG. 3, the catalyst particles 1123 are supported mainly in these pores (small holes) 1125a. This is demonstrated by plotting the relationship between the pore radii and the pore volumes before and after supporting the catalyst particles by the method described above. That is, when radii of the pores are plotted in relation with volumes of the pores, the peak value in the pore diameter range of 2 to 6 nm becomes lower after supporting the catalyst particles relative to before supporting the catalyst particles. In other words, the pore volume becomes less, suggesting that the catalyst particles are supported inside the pores. It is preferable that the reduction rate caused by this be 10% or more. This is because if the reduction rate is less than this value, amount of the catalyst particles supported inside the pores are too small to obtain the desired performance. Meanwhile, the higher the reduction rate is, the more the catalyst particles are supported inside the pores, however, practically the upper limit of the reduction rate is about 50%.

As discussed above, according to this embodiment, the catalyst particles 1123 are supported inside the pores 1125a, too, while the ionomer 1122 cannot enter into the pores 1125a. Because of this, the ORR activity of the catalyst is not hindered, so that the performance inherently possessed by the catalyst can be expressed. In addition, because there are so many pores 1125a, possibility that many catalyst particles 1123 are present in the same pore 1125a is so small that it became possible to prevent lowering of the oxygen transporting capacity due to competition for catching oxygen among the catalyst particles from occurring.

Namely, according to this embodiment, many pores 1125a are formed in the carrier to support the catalyst so that the surface area of the carrier is large. Therefore, the catalyst particles are well dispersed. Because of this, ECSA (Electrochemical Surface Area, or active surface area) increases so that deterioration of the oxygen dispersibility can be suppressed. In addition, because the catalyst particles are present in the pores 1125a, influence of the ionomer covering is suppressed, thereby leading to enhancement of the ORR activity. Moreover, because the distance between the catalyst particles becomes more apart, the competition for catching oxygen among them can be suppressed, and in addition, growth of the particle radius due to bonding of the catalyst particles among themselves as the passage of time can be suppressed.

Furthermore, the graphene layer is formed on the pore wall. This graphene layer has water-repellent property. Accordingly, mobility of water from the pores to the ionomer is high. Because of this, the high flooding resistance can be obtained.

Meanwhile, especially when a platinum alloy is used as the material for the catalyst, the flooding resistance can be markedly enhanced, and as a result, durability thereof can be improved further. It can be said that the platinum alloy has high performance because inherently it has higher catalyst activity at the low current density as compared with platinum. However, if the platinum alloy particles are used to the conventional carbon carrier, it has been known that the performance thereof decreases drastically because the oxygen dispersibility is deteriorated at the high current density, and thus, this has not been used practically. In addition, at present, durability thereof has been lower as compared with platinum. However, when the carrier to support the catalyst was made so as to be the one shown in this embodiment, the gas dispersibility could be improved while keeping the effect to enhance the catalyst activity. In other words, when the carrier to support the catalyst was made so as to be the one shown in this embodiment, it became possible to apply the platinum alloy for this purpose for the first time.

In the above, the embodiments of the present invention have been explained, however, the embodiments mentioned above showed only part of the application examples of the present invention, so that the foregoing explanation does not intend to confine the technical scope of the present invention into the specific composition of the above-mentioned embodiments.

For example, in the above-mentioned explanation, as one example of the meso porous carbons, the method in which it is produced from the metal-incorporated tree-like nanostructure was mentioned, but other methods or other structures may be allowed as well. In addition, as one example of the structures of the carbon having the graphene layer formed on the wall of the pores (meso pores), the meso porous carbon was mentioned, however, other structures may be allowed as well. As one example of the structures having in the pore diameter range of 2 to 6 nm when radii of the pores are plotted in relation with volumes of the pores the peak value of more than 1 cm$^3$/g and also the BET specific surface area of more than 1300 m$^2$/g, the meso porous carbon was mentioned, however, other structures may be allowed as well.

Hereunder, the present invention will be explained more specifically, however, the present invention is not limited to these Examples.

(1) Fabrication of the Membrane Electrode Assembly (MEA) and the Cell

The powdered catalyst was prepared by using a carbon carrier as the conductive porous carrier, to which a platinum cobalt (PtCo) alloy having the particle radius of 2 to 6 nm was supported as the catalyst in such a way that the mass ratio thereof might become 30%. Meanwhile, besides the PtCo alloy, there are alloys of PtNi, PtFe, PtCu, PtRu, PtIr, PtAu, and so forth, and these may be used as well. Specific example of the metal particle of the other usable metals includes particles of at least one metal selected from the group consisting of rhodium (Rh), palladium (Pd), osmium (Os), tungsten (W), lead (Pb), chromium (Cr), manganese (Mn), vanadium (V), molybdenum (Mo), gallium (Ga), and aluminum (Al). The alloy is preferably comprised of platinum in the range of 30 to 90% by atom and a metal to be alloyed with platinum in the range of 10 to 70% by atom, though this composition ratio is different depending on the metal to be alloyed. Meanwhile, the alloy here is the general collective term for a metal element added with at least one metal element or non-metal element whereby having a metallic property. There are many alloy tissues including: a eutectic alloy, a sort of a mixture in which each of the constituent elements forms different crystals, a solid solution in which the constituent elements are completely dissolved together, an intermetallic compound of the constituent elements, and a compound between a metal and a non-metal. In the present invention, any of them may be used.

This powdered catalyst and the ionomer disperse solution (Nafion (registered trade mark) D2020, manufactured by E. I. DuPont de Nemours and Company) as the solid proton conductive material were mixed in such a way that the mass ratio of the carbon carrier to the ionomer might become 0.9. Then, a solvent comprising water and NPA (1-propanol) with the mass ratio of 6:4 was added to the said mixture in such a way that the solid fraction (Pt alloy+carbon carrier+ionomer) might become 5% to obtain the catalyst ink. Then, the ink thus obtained was applied as the hydrophilic porous layer onto the polytetrafluoroethylene (PTFE) substrate by a spraying method with the size of 5 cm×2 cm such that about 0.15 mg/cm$^2$ of Pt might be supported thereon. After coating, it was dried at 80° C. for 15 minutes to obtain the catalyst layer.

The catalyst layer thus obtained was transferred to the electrolyte membrane (Nafion (registered trade mark) NR211, manufactured by E. I. DuPont de Nemours and Company) to obtain the membrane electrode assembly (MEA). Meanwhile, this transformation was carried out at 150° C. and 0.8 MPa for 10 minutes. Both sides of the membrane electrode assembly thus obtained were sandwiched by the gas diffusing layers (24BC, manufactured by SGL Carbon Japan Co., Ltd.), then by the carbon separators, and further by the gold-plated current collecting plates to fabricate the cell.

As to the carbon carrier, three kinds of the carbon as shown in Table 1 were used in this experiment.

TABLE 1

|  | BET specific surface area | Raman spectrometric method (R-value) |
|---|---|---|
| Example 1 | 1670 m$^2$/g | 1.2 |
| Comparative Example 1 | 718 m$^2$/g | 1.8 |
| Comparative Example 2 | 151 m$^2$/g | 0.7 |

(2) Characteristics of the Conductive Porous Carrier and the Method for Preparing it In Comparative Example, 1, Ketjen Black (registered trade mark) EC600 JD, manufactured by Ketjen Black International Co.) was used.

In Comparative Example 2, the Ketjen black that was made to graphite by burning the Ketjen black used in Comparative Example 1 under a nitrogen atmosphere at 2000° C. in an electric furnace for one hour was used.

Figure 4:
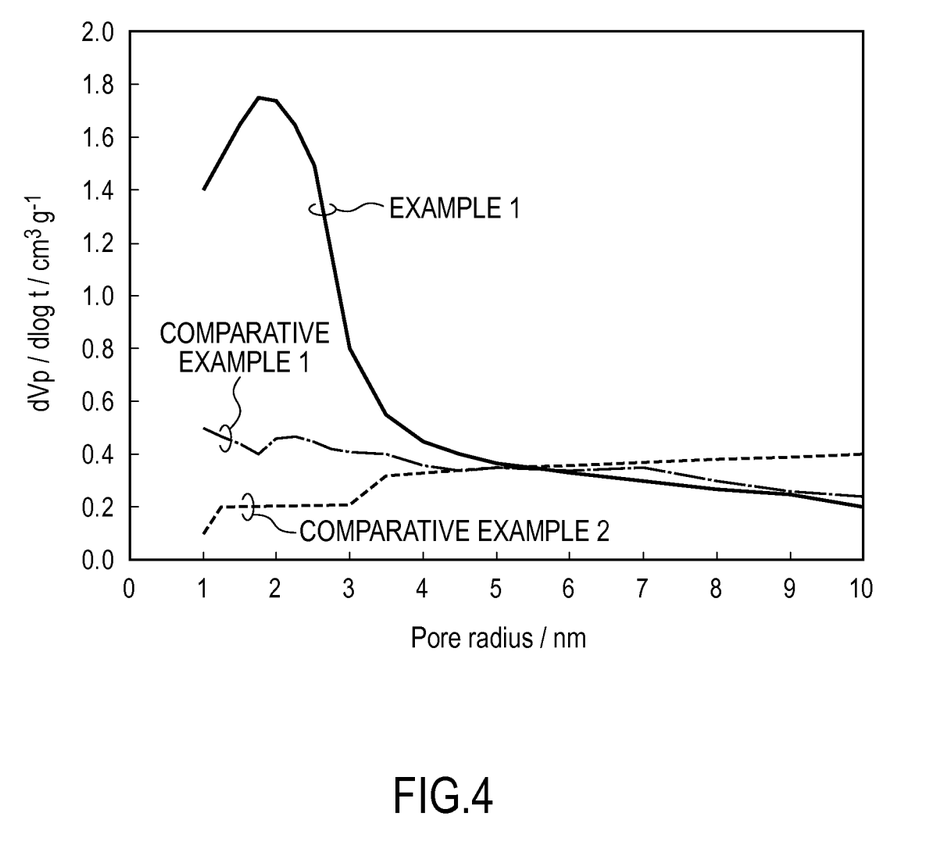
FIG. 4 shows the drawing by which distribution of the pore radii (vacant holes' radii) of the carbon material.
Figure 5:
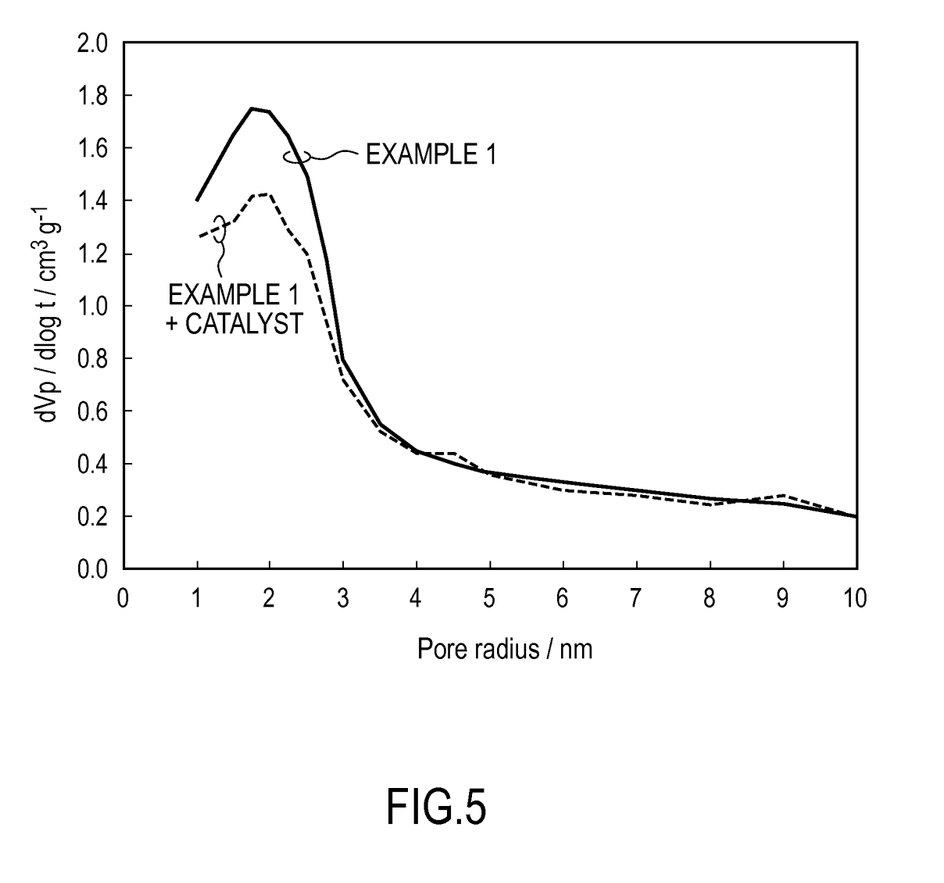
FIG. 5 shows the drawing in which relationship between the pore radii and the pore volumes is plotted.

In Example 1, the meso porous carbon as one example of the present invention was used. This carbon is characterized by many pores (vacant holes) with the size of about 2 to 6 nm. In FIG. 4, distributions of the pore radii (radii of the vacant holes) of the carbon materials are shown. Meanwhile, the horizontal axis of FIG. 4 shows the pore radius. In FIG. 4, it can be seen that the material of Example 1 has especially a large pore volume. Because of this, as shown in FIG. 3, the platinum alloy catalyst particles are supported mainly in these pores (small holes) 1125a. This can be demonstrated by plotting the relationships between the pore radii and the pore volumes before and after supporting the catalyst particles by the afore-mentioned method (FIG. 5). That is, when radii of the pores thereof are plotted in relation with volumes of the pores, the peak value in the pore diameter range of 2 to 6 nm becomes lower after supporting the catalyst particles relative to before supporting the catalyst particles. In other words, the pore volume becomes smaller, suggesting that the catalyst particles are supported inside the pores. It is preferable that the reduction rate caused by this be 10% or more. Because if the reduction rate is less than this value, amount of the catalyst particles supported inside the pores are too small to obtain the desired performance. Meanwhile, the higher the reduction rate is, the more the catalyst particles are supported inside the pores, however, practically the upper limit of the reduction rate is about 50%.

As one example of the meso porous carbon, a tree-like carbon nanostructure in which the carbon-containing body in the rod-like or the ring-like form is branched may be mentioned. Meanwhile, as one example of the meso porous carbon, the method in which it is produced from the metal-incorporated tree-like nanostructure was mentioned, but other methods or other structures may be allowed as well. As one example of the structure having in the pore diameter range of 2 to 6 nm when the radii of the pores are plotted in relation with the volumes of the pores the peak value of more than 1 cm³/g and also the BET specific surface area of more than 1300 m²/g, the meso porous carbon was mentioned, however, other structures may be allowed as well.

(3) Measurement Methods of the BET Specific Surface Area and the Pore Radius Distribution 1. Sampling, Weighing, and Preliminary Drying Powders of about 0.04 to 0.07 g were accurately weighed into respective test tubes. The powders in these test tubes were preliminarily dried in a vacuum dryer at 90° C. for several hours to obtain the test samples. The weighing measurement was done by using the electronic balance manufactured by Shimadzu Corp. (AW220). Meanwhile, as to the coated sheet, the net mass of about 0.03 to 0.04 g obtained by subtracting the mass of the Teflon (registered trade mark, substrate) having the same area from the total mass was used as the sample mass.

2. Measurement Conditions

Measurement instrument: High accuracy all-automated gas adsorption instrument manufactured by BEL Japan, Inc. BELSORP 36

Adsorption gas: $N_2$

Dead volume measurement gas: He

Adsorption temperature: 77 K (temperature of liquid nitrogen)

Pre-measurement treatment: vacuum dry at 90° C. for several hours (the sample was set on the measurement stage after purging with He)

Measurement mode: isothermal adsorption process and desorption process

Measurement relative pressure P/P0: about 0 to 0.99

Setting time for equilibration: 180 seconds for every relative pressure

3. Measurement Method

The BET plotting is obtained within about 0.00 to 0.45 as the relative pressure (P/P0) in the adsorption side of the adsorption and desorption isothermal curve, and from the slope thereof, the BET specific surface area is calculated. From the information obtained herein, the relationship between the pore radii and the pore volumes can be obtained at the same time. The analysis of the pore radius distribution was done by the DH method.

4. Raman Spectrometric Method

As one indicator of durability of a carbon carrier, crystallinity of a carbon material may be evaluated by the ratio of the G-band peak intensity and the D-band peak intensity.

When a carbon material is analyzed by the Raman spectrometric method, peaks are usually observed near 1340 $cm^{-1}$ and near 1580 $cm^{-1}$. These peaks are usually called "D-band" and "G-band". Meanwhile, the peak of diamond is observed strictly at 1333 $cm^{-1}$, which is distinguishable from the D-band. Crystallinity of the carbon material can be evaluated from R-value (R=D/G), the intensity ratio of these bands. Generally, it is said that the smaller the R-value is, the higher the crystallinity and the durability of the carbon material are.

5. Performance Evaluation

The MEA which was obtained by the method as mentioned above was incorporated into a fuel cell to evaluate the power generation performance thereof. The fuel cell was kept at 70° C., and hydrogen gas wetted with 100% relative humidity was supplied to the anode, and the gas with the oxygen concentration of 12% prepared from an air and nitrogen and wetted with 100% relative humidity was supplied to the cathode, respectively. Each gas was applied by the pressure of 100 kPa (gauge pressure) so that the respective gases with sufficient amounts for power generation might be supplied at the constant rates. The current density was increased with the increment of 0.2 A/cm, such as, for example, 0.2, 0.4, and 0.6 A/cm², and when large decrease of the voltage was not observed, the current density was changed till 2.0 A/cm². The relationship between the currency and the voltage obtained by such measurement was plotted in a graph. The I-V characteristics obtained as mentioned above is shown in FIG. 6.

Figure 6:
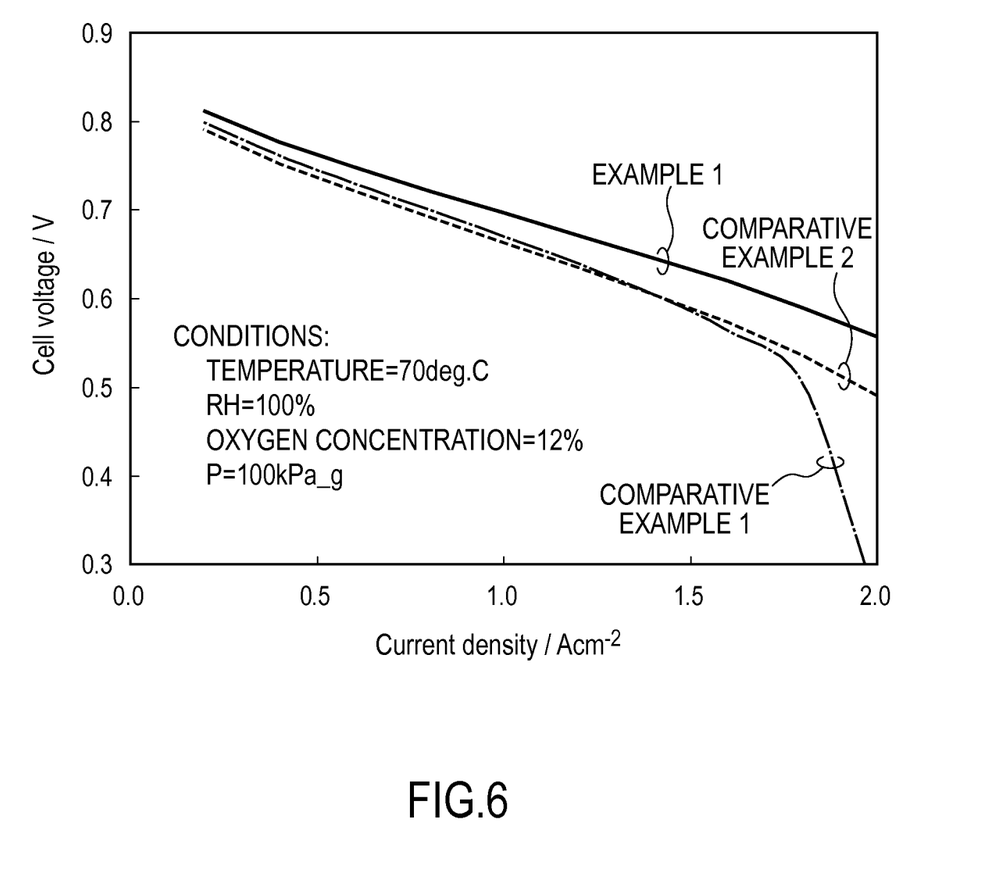
FIG. 6 shows the I-V characteristic diagram.

In Comparative Example 1, the performance is rapidly deteriorated in the high current density side, and in Comparative Example 2, although the decrease of the voltage in the high current density region is small, the performance tends to be low in entire of the current density region. On the other hand, in Example 1, the performance is high in the low current density region, while the performance is not deteriorated significantly even at the high current density region, and thus, it was found that the performance could be improved in the entire region.

Therefore, if the platinum alloy is used as the material for the catalyst, the flooding resistance at the high current density can be markedly enhanced. It can be said that the platinum alloy has high performance because inherently it has higher catalyst activity at the low current density as compared with platinum. However, if the platinum alloy particles are used to the conventional carbon carrier, it has been known that the performance thereof decreases drastically because the oxygen dispersibility is deteriorated at the high current density, and thus, this has not been used practically. In addition, at present, durability thereof has been lower as compared with platinum. However, when the carrier to support the catalyst was made so as to be the one shown in this embodiment, the gas dispersibility could be improved while keeping the effect to enhance the catalyst activity. In other words, when the carrier to support the catalyst was made so as to be the one shown in this embodiment, it became possible to apply the platinum alloy for this purpose for the first time.

According to the Example, many pores 1125a are formed in the carrier to support the catalyst so that the surface area of the carrier is large. Therefore, the catalyst particles are well dispersed. Because of this, ESA (Electrochemical Surface Area, or active surface area) increases so that deterioration of the oxygen dispersibility can be suppressed. In addition, because the catalyst particles are present in the pores 1125a, influence of the ionomer covering is suppressed, thereby leading to enhancement of the ORR activity. Moreover, because the distance between the catalyst particles becomes more apart, the competition for catching oxygen among them can be suppressed, and in addition, growth of the particle radius due to bonding of the catalyst particles among themselves as the passage of time can be suppressed.

The present application claims the priority right based on the Japanese Patent Application No. 2012-41754 filed to the Japan Patent Office on Feb. 28, 2012, and all the contents in the said application are incorporated into the present description by referring to it.

The invention claimed is:

1. A cathode electrode for a fuel cell, comprising:
  a conductive carrier having pores formed on a surface thereof, at least a portion of the pores having a pore diameter in a range of 2 to 6 nm; and
  a catalyst having a platinum alloy, at least a portion of the platinum alloy being supported in the portion of the pores of the conductive carrier having the pore diameter in the range of 2 to 6 nm, wherein
  when pore diameters are plotted in relation with pore volumes, a peak value of pore volume is present in a pore diameter range of 2 to 6 nm and the peak value of pore volume is more than 1 cm$^3$/g,
  the conductive carrier has a BET specific surface area of more than 1300 m$^2$/g,
  an ionomer partially covers the surface of the conductive carrier, and
  the portion of the platinum alloy supported in the portion of the pores of the conductive carrier having the pore diameter in the range of 2 to 6 nm does not contact the ionomer,
  wherein the conductive carrier is a particle.

2. The cathode electrode for a fuel cell according to claim 1, wherein the conductive carrier has an R-value of more than 0.7 and less than 1.8, where the R-value is an intensity ratio of a peak near 1340 cm$^{-1}$ (D-band) and a peak near 1580 cm$^{-1}$ (G-band) as measured by a Raman spectrometric method.

3. The cathode electrode for a fuel cell according to claim 1, wherein when the pore diameters are plotted in relation with the pore volumes, in the pore diameter range of 2 to 6 nm, the peak value is reduced by 10% or more and 50% or less after the conductive carrier supports the catalyst relative to the peak value before the conductive carrier supports the catalyst.

4. The cathode electrode for a fuel cell according to claim 1, wherein the conductive carrier is a structure body comprised of carbon, and a graphene layer is formed on a wall of the pores.

5. The cathode electrode for a fuel cell according to claim 1, wherein the platinum alloy comprises platinum cobalt.

6. The cathode electrode for a fuel cell according to claim 1, wherein the platinum alloy comprises platinum nickel, platinum iron, platinum copper, platinum ruthenium, platinum iridium, or platinum gold.

7. The cathode electrode for a fuel cell according to claim 1, wherein the platinum alloy comprises platinum in an amount of 30 to 90% by atom, and a metal to be alloyed with the platinum in an amount of 10 to 70% by atom.

8. The cathode electrode for a fuel cell according to claim 7, wherein the metal comprises rhodium, palladium, osmium, tungsten, lead, chromium, manganese, vanadium, molybdenum, gallium, or aluminum.

9. The cathode electrode for a fuel cell according to claim 1, wherein the cathode electrode is arranged in the membrane electrode assembly including an electrolyte membrane, an anode electrode catalyst layer arranged on one surface of the electrolyte membrane, and a cathode electrode catalyst layer arranged on another surface of the electrolyte membrane.

10. The cathode electrode for a fuel cell according to claim 1, wherein water is arranged in the pores.

11. The cathode electrode for a fuel cell according to claim 1, wherein the conductive carrier has a BET specific surface area of less than 1670 m$^2$/g.

12. The cathode electrode for a fuel cell according to claim 1, wherein the conductive carrier has a tree-like carbon nanostructure.

13. The cathode electrode for a fuel cell according to claim 1, wherein
  the ionomer is in contact with the conductive carrier to close an opening of a part of the pores, and
  a part of the platinum alloy supported in the part of the pores is not in contact with the ionomer.

* * * * *